(12) United States Patent
Iwakiri et al.

(10) Patent No.: US 8,742,356 B2
(45) Date of Patent: Jun. 3, 2014

(54) RADIATION IMAGE DETECTING DEVICE

(75) Inventors: Naoto Iwakiri, Kanagawa (JP); Haruyasu Nakatsugawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 126 days.

(21) Appl. No.: 13/483,736

(22) Filed: May 30, 2012

(65) Prior Publication Data

US 2012/0312997 A1 Dec. 13, 2012

(30) Foreign Application Priority Data

Jun. 7, 2011 (JP) ................................. 2011-127208

(51) Int. Cl.
*G01T 1/20* (2006.01)
*G01T 1/164* (2006.01)

(52) U.S. Cl.
CPC ................ *G01T 1/20* (2013.01); *G01T 1/1644* (2013.01); *G01T 1/2018* (2013.01)
USPC ........................................................ 250/366

(58) Field of Classification Search
USPC ........................................................ 250/366
See application file for complete search history.

(56) References Cited

U.S. PATENT DOCUMENTS

| | | | |
|---|---|---|---|
| 8,049,177 B2 | 11/2011 | Sato et al. | |
| 2004/0009649 A1* | 1/2004 | Kub et al. | 438/459 |
| 2008/0011960 A1* | 1/2008 | Yorkston et al. | 250/370.09 |
| 2008/0093558 A1* | 4/2008 | Shoji et al. | 250/361 R |
| 2008/0149852 A1* | 6/2008 | Shoji et al. | 250/483.1 |
| 2011/0121190 A1* | 5/2011 | Ohta et al. | 250/370.08 |

FOREIGN PATENT DOCUMENTS

| | | | | |
|---|---|---|---|---|
| JP | 2007035847 | * | 2/2007 | ............. H01L 23/02 |
| JP | 2010-096616 | | 4/2010 | |

OTHER PUBLICATIONS

F. Piuz et al. "The CsI-based ring imaging detector for the ALICE experiment: technical description of a large prototype" Nuclear Instruments and Methods in Physics Research A 433 (1999) 222-234.*

* cited by examiner

*Primary Examiner* — David Porta
*Assistant Examiner* — Edwin Gunberg
(74) *Attorney, Agent, or Firm* — Jean C. Edwards, Esq.; Edwards Neils PLLC

(57) ABSTRACT

A substrate is made of copper having an atomic number of 29. The substrate is formed in the shape of a box without a top, and has a rectangular bottom and sidewalls erected at four sides surrounding the bottom. A scintillator is evaporated onto the bottom. The scintillator includes a non-columnar crystal and a plurality of columnar crystals erected by crystal growth. A photodetector tightly adheres to top surfaces of the sidewalls of the substrate through an O-ring, so as to close the top of the box-shaped substrate. The substrate, the photodetector, and the O-ring seal the scintillator in an air-tight manner.

18 Claims, 8 Drawing Sheets

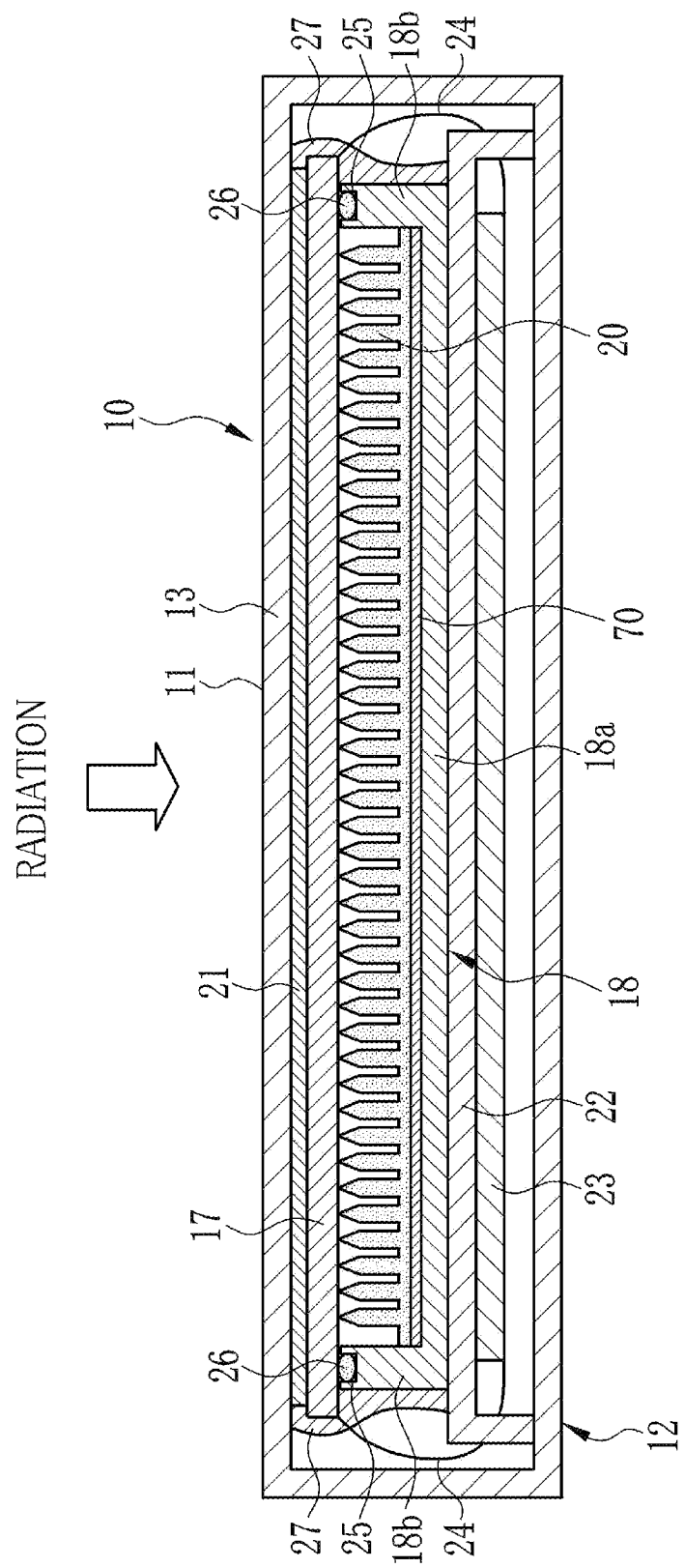

RADIATION IMAGE DETECTING DEVICE

CROSS-REFERENCE TO RELATED APPLICATIONS

The present application claims priority from Japanese Patent Application No. 2011-127208 filed on Jun. 7, 2011, the contents of which are herein incorporated by reference in their entirety.

BACKGROUND OF THE INVENTION

1. Field of the Invention

The present invention relates to a radiation image detecting device that is used in a radiation imaging apparatus, to detect a radiation image after conversion of the radiation image into an optical image.

2. Description Related to the Prior Art

A radiation imaging apparatus includes a radiation generating device for emitting radiation i.e. X-ray and a radiation image detecting device for detecting a radiation image that is formed by the radiation passed through a sample. As a type of radiation image detecting device, an indirect conversion type radiation image detecting device is known. The indirect conversion type radiation image detecting device, which has a photodetector and a scintillator stacked to each other, detects the radiation image after conversion of the radiation image into an optical image. The scintillator is a phosphor layer of CsI, GOS ($Gd_2O_2S$; Tb), or the like, and converts the radiation image into the optical image. The photodetector has an array of pixels each of which includes a photodiode (PD) and a thin film transistor (TFT) formed in a substrate. The photodetector converts light radiating from the scintillator into electric charge by each PD, and accumulates the electric charge on a pixel-by-pixel basis. This electric charge is read out via the TFT.

The indirect conversion type radiation image detecting device adopts either a PSS (penetration side sampling) method or an ISS (irradiation side sampling) method. In the PSS method, the scintillator and the photodetector are disposed in this order from a radiation incident side. Contrarily, in the ISS method, the photodetector and the scintillator are disposed in this order from the radiation incident side. In the ISS method, the scintillator converts the radiation passed through the photodetector into the light, and the PDs detect the light propagating in a direction opposite to a radiation incident direction. The scintillator emits the light by a larger amount on its radiation entrance side than on an opposite side (radiation exit side). Since the photodetector is opposed to the radiation entrance side of the scintillator in the ISS method, the ISS method has the advantage over the PSS method in sensitivity and image sharpness.

U.S. Pat. No. 8,049,177 corresponding to Japanese Patent Laid-Open Publication No. 2011-17683 discloses a radiation image detecting device of the ISS method in which a scintillator is formed of columnar crystals of CsI or the like on a substrate (support substrate). The scintillator is disposed such that tip ends of the columnar crystals are opposed to a photodetector. In this scintillator, light is produced in each columnar crystal upon application of the radiation, and propagates through the same columnar crystal by a light guide effect of the columnar crystal. The columnar crystals prevent dispersion of the light produced in the scintillator, so the sharpness of the radiation image is improved.

In this scintillator, a carbon plate, a CFRP (carbon fiber reinforced plastic) plate, a glass plate, a quartz plate, a sapphire plate, or a metal sheet made of iron, tin, chromium, aluminum, or the like is used as the substrate. Out of these materials, an aluminum sheet is most generally used as the substrate. However, aluminum has a high backscatter coefficient, in other words, scatters a large amount of the incident radiation in a return direction. Thus, in the radiation image detecting device of the ISS method, the radiation backscattered by the substrate causes unnecessary light emission in the scintillator. This light exits from the scintillator at a position away from an entrance position of the radiation, and therefore degrades the sharpness of the detected radiation image.

Japanese Patent Laid-Open Publication No. 2010-096616 proposes to provide on a substrate a radiation absorbing layer made of a material containing lead, tungsten, tantalum, or the like having an atomic number of 50 or more, in the radiation image detecting device of the ISS method. The radiation absorbing layer absorbs the radiation and reduces backscattering.

However, the provision of the radiation absorbing layer made of the material having the large atomic number to reduce the backscattering, as described above, and additionally, the formation of the columnar crystals on the radiation absorbing layer necessarily cause weight increase. Thus, this is unsuitable for a portable type radiation image detecting device such as an electronic cassette. Also, since the columnar crystals of CsI or the like deliquesce, the scintillator must be highly resistant to moisture.

SUMMARY OF THE INVENTION

A main object of the present invention is to provide a radiation image detecting device that can reduce backscattering without increasing its weight.

Another object of the present invention is to provide the radiation image detecting device that improves moisture resistance of a scintillator.

To achieve the above and other objects, a radiation image detecting device according to the present invention includes a substrate formed of a material containing any one or two or more elements having an atomic number of 20 to 31 as a main ingredient, a scintillator having a plurality of columnar crystals formed on the substrate by evaporation, and a board-shaped photodetector. The scintillator converts incident radiation into light, and emits the light from a tip end portion of each columnar crystal. The photodetector is opposed to the tip end portions of the columnar crystals. The photodetector detects the light emitted from the tip end portions.

The substrate is preferably in a shape of a box having a bottom, sidewalls, and an opened top. The scintillator is formed on the bottom, and the plurality of columnar crystals are erected to the top. The photodetector is preferably overlaid on the sidewalls so as to tightly seal an interior of the substrate.

The scintillator and the photodetector may be contained in a housing of an electronic cassette.

The substrate is preferably made of a material containing any one or two or more elements having an atomic number of 22 to 30 as a main ingredient. The substrate is more preferably made of a material containing copper as a main ingredient.

The radiation preferably enters the scintillator through the photodetector.

The photodetector is preferably joined to the sidewalls of the substrate through the medium of a sealing member. The sealing member may be an O-ring.

A flexible fixing agent may be applied to the sidewalls and side surfaces of the photodetector, to join the sidewalls and the photodetector. The sidewalls and said photodetector may be joined together with a dissolvable adhesive. Adhesion of the dissolvable adhesive is reduced by irradiation with ultraviolet light.

A light reflection layer for reflecting light having an emission peak wavelength of the scintillator may be provided on the substrate, and said scintillator is formed on the light reflection layer. The light reflection layer is preferably made of aluminum.

The tip end portions of the columnar crystals are preferably in contact with the photodetector. The tip end portion of the columnar crystal is preferably in the shape of a cone. The plurality of columnar crystals are preferably separated to each other by a gap.

The scintillator may be cesium iodide, and the plurality of columnar crystals may be formed on the bottom through the medium of a non-columnar crystal.

The photodetector preferably has a plurality of photoelectric converters arranged into a matrix. Each photoelectric converter preferably has a photoelectric conversion film made of silicon or an organic photoelectric conversion material.

According to the radiation image detecting device of the present invention, since the substrate is made of the material containing one or more elements having an atomic number of 20 to 31, it is possible to reduce the backscattering without increase in weight. The substrate is formed in the shape of a box without a top, and the substrate and the photodetector tightly seal the scintillator. Thus, the moisture resistance of the scintillator is improved. Furthermore, the box-shaped substrate has less flexibility, even if the thickness of the substrate is small. Thus, the box-shaped substrate is superior in handling and load resistance.

BRIEF DESCRIPTION OF THE DRAWINGS

For more complete understanding of the present invention, and the advantage thereof, reference is now made to the following descriptions taken in conjunction with the accompanying drawings, in which:

FIG. 8 is a schematic sectional view of the electronic cassette according to further another embodiment of the present invention.

DESCRIPTION OF THE PREFERRED EMBODIMENTS

Figure 1:
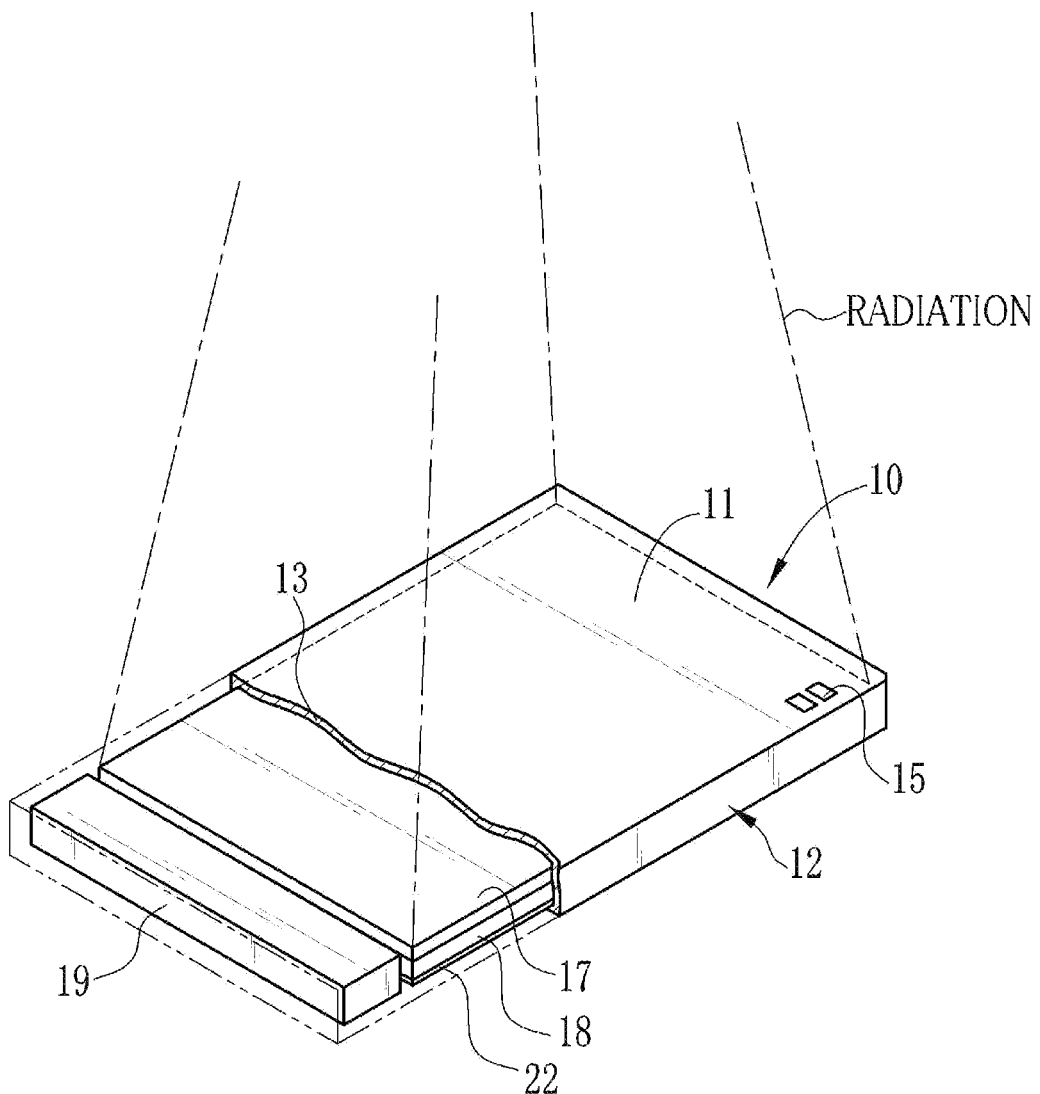
FIG. 1 is a perspective view of an electronic cassette shown partially broken away.

As shown in FIG. 1, a radiation image detecting device of the present invention is used as an electronic cassette 10, for example. This electronic cassette 10 is the same size as a conventional cassette containing an X-ray film or an IP plate, and is loadable in a cassette chamber of an imaging support instead of the X-ray film cassette, for example. A housing 12 of the electronic cassette 10 is in a box shape as a whole, and its top in a rectangular shape functions as a radiation receiving surface 11 upon which radiation passed through a sample (patient's body) is incident. A top plate 13 of the housing 12 is made of a low radiation absorbing material such as carbon, to prevent absorption of the radiation and ensure sufficient strength. The housing 12, excepting the top plate 13, is made of a radiation transparent material, for example, ABS resin.

The radiation receiving surface 11 of the electronic cassette 10 is provided with an indicator 15 having a plurality of LEDs. The indicator 15 indicates an operation state of the electronic cassette 10, such as an operation mode (for example, on standby, on data transmission, and the like) and remaining battery charge. The indicator 15 may be composed of another type of light emitting elements other than the LEDs, or a display device such as a liquid crystal display or an organic EL display. The indicator 15 may be provided in another location other than the radiation receiving surface 11. The liquid crystal display is convenient to display a patient's name (patient's ID), a body part to be imaged, imaging conditions, and the like retrieved from an image acquisition controller, in addition to the operation state.

The housing 12 of the electronic cassette 10 contains a photodetector 17 and a scintillator 20 (see FIG. 2) supported by a substrate 18 that are disposed in this order in a radiation incident direction in which the radiation passed through the sample propagates. The substrate 18 is in the shape of a box without a top. The scintillator 20 is evaporated onto the inner bottom of the substrate 18. The substrate 18 is joined to a margin of the photodetector 17.

The housing 12 also contains a case 19 at one end in a longitudinal direction of the radiation receiving surface 11. The case 19 encloses a rechargeable and detachable battery (secondary battery) and various electric circuits including a microcomputer. The battery supplies electric power to various electric circuits of the electronic cassette 10 including the photodetector 17. A radiation shielding member (not shown) made of lead or the like is provided under the top plate 13 and above the case 19, for the purpose of preventing damage to the electric circuits contained in the case 19 by radiation irradiation.

Figure 2:
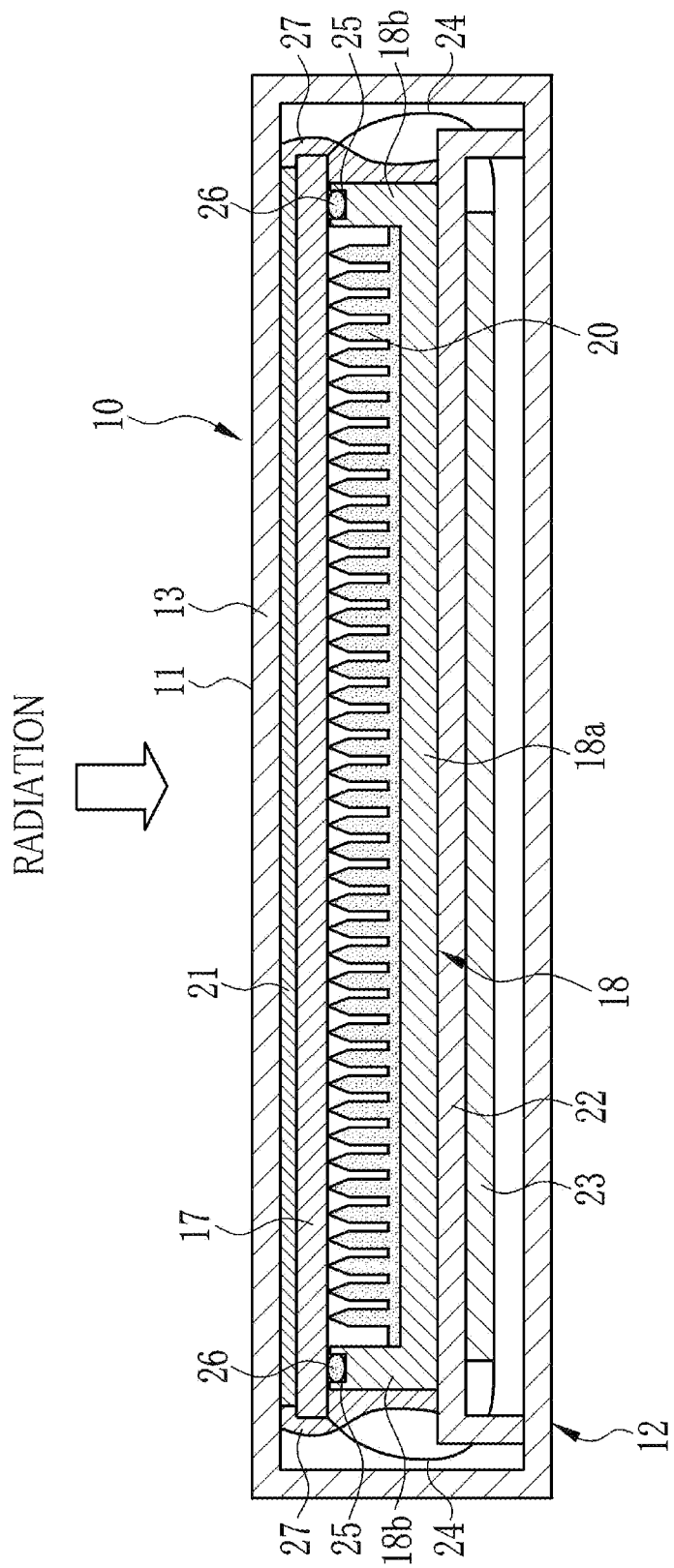
FIG. 2 is a schematic sectional view of the electronic cassette.

As shown in FIG. 2, the photodetector 17 is glued on an entire interior surface of the top plate 13 with an adhesive layer 21. A base 22 is attached to the bottom of the housing 12, and a control board 23 is attached onto a lower surface of a table of the base 22 with screws or the like. The control board 23 is electrically connected to the photodetector 17 through flexible cables 24.

The substrate 18 made of copper (Cu) is secured on an upper surface of the table of the base 22. The substrate 18 in the shape of a box without a top, as described above, includes a rectangular bottom 18a and sidewalls 18b erected at four sides surrounding the bottom 18a. The bottom 18a has a thickness of the order of 0.3 mm.

A top surface of each sidewall 18b is formed with a groove 25. A rubber or plastic O-ring (annular packing) 26 is fitted as a sealing member into the grooves 25 of the sidewalls 18b. The photodetector 17 makes contact with the top surfaces of the sidewalls 18b at its margin, and tightly adheres thereto through the O-ring 26. In another case, the grooves 25 for fitting the O-ring 26 may be formed in the photodetector 17. The inside of the O-ring 26 may be depressurized.

A flexible fixing agent 27 is applied to the entire periphery of the photodetector 17 and the sidewalls 18b of the substrate 18 to secure the photodetector 17 and the substrate 18. The scintillator 20 is formed on the substrate 18, and air-tightly sealed with the substrate 18, the photodetector 17, and the O-ring 26.

Figure 3:
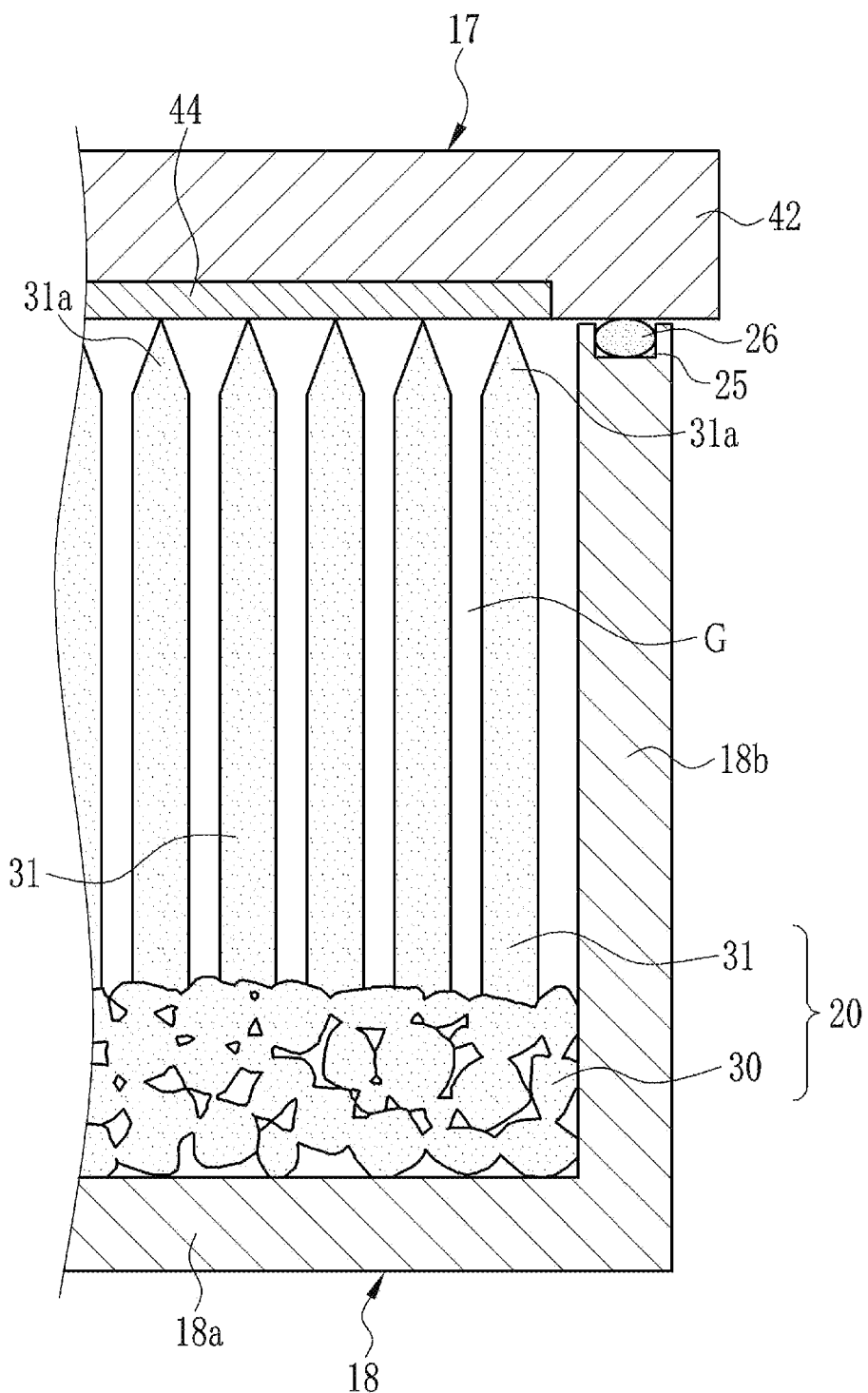
FIG. 3 is a schematic sectional view of a scintillator.

As shown in FIG. 3, the scintillator 20 includes a non-columnar crystal 30 formed on the substrate 18 and a plurality of columnar crystals 31 erected by crystal growth. The scintillator 20 absorbs the radiation that has been incident upon the radiation receiving surface 11 of the housing 12 through the sample and has entered the scintillator 20 through the top plate 13 and the photodetector 17, and radiates light (visible light).

The scintillator 20 is formed by evaporating thallium activated cesium iodide (CsI:Tl) onto the bottom 18a of the substrate 18. The non-columnar crystal 30 is formed on the side of the substrate 18, and the columnar crystals 31 are formed on the side of the photodetector 17. The columnar crystals 31 are separated to each other by a gap G. The average diameter of each columnar crystal 31 is almost uniform (for example, approximately 1 μm) in its longitudinal direction. Note that, the scintillator 20 may be formed of sodium activated cesium iodide (CsI:Na) or the like, instead of CsI:Tl.

Since the electronic cassette 10 adopts the ISS method, the radiation enters the scintillator 20 through the photodetector 17. The light is produced in the scintillator 20 mainly on the side of the photodetector 17 of the columnar crystals 31. Out of the light produced in the scintillator 20, light directed upward and obliquely upward propagates through each columnar crystal 31 by a light guide effect of the columnar crystal 31, and exits from a tip end portion 31a to the photodetector 17. The light is produced at a position near the photodetector 17, so the light enters the photodetector 17 at high intensity. The tip end portion 31a is approximately in the shape of a cone having an acute vertex of 40° to 80°, for example. The cone-shaped tip end portion 31a is superior to a convex curved tip end portion in reduction of light reflection and improvement of light emission efficiency from the tip end portion, as described in U.S. Pat. No. 7,531,817 corresponding to WO 2008/029610. Note that, the length of the tip end portion 31a is of the order of 1 μm.

Out of the light produced in the columnar crystals 31, light directed downward and obliquely downward reaches the non-columnar crystal 30 by the light guide effect, and is reflected from the non-columnar crystal 30 to the photodetector 17. The reflected light returns through each columnar crystal 31, and enters the photodetector 17. Thus, the non-columnar crystal 30 has the function of improving the light emission efficiency from the tip end portions 31a and the sharpness of a radiation image with the use of the light guide effect.

The columnar crystals 31a are disposed separately from each other at a filling rate (occupation rate of the columnar crystals 31 per area) of the order of 70 to 85%. If the filling rate is too low (for example, less than 70%), the light emission amount of the scintillator 20 is significantly reduced. If the filling rate is too high (for example, more than 85%), the adjoining columnar crystals 31 easily make contact. The contact among the columnar crystals 31 causes the occurrence of a crosstalk, and degrades the sharpness of the radiation image. The filling rate is preferably at 75 to 80%.

In this embodiment, the tip end portions 31a of the columnar crystals 31 directly make contact with the photodetector 17. This brings about increase in the light emission efficiency to the photodetector 17, as compared with the case of providing a resin layer or the like between the tip end portions 31a and the photodetector 17.

Figure 4:
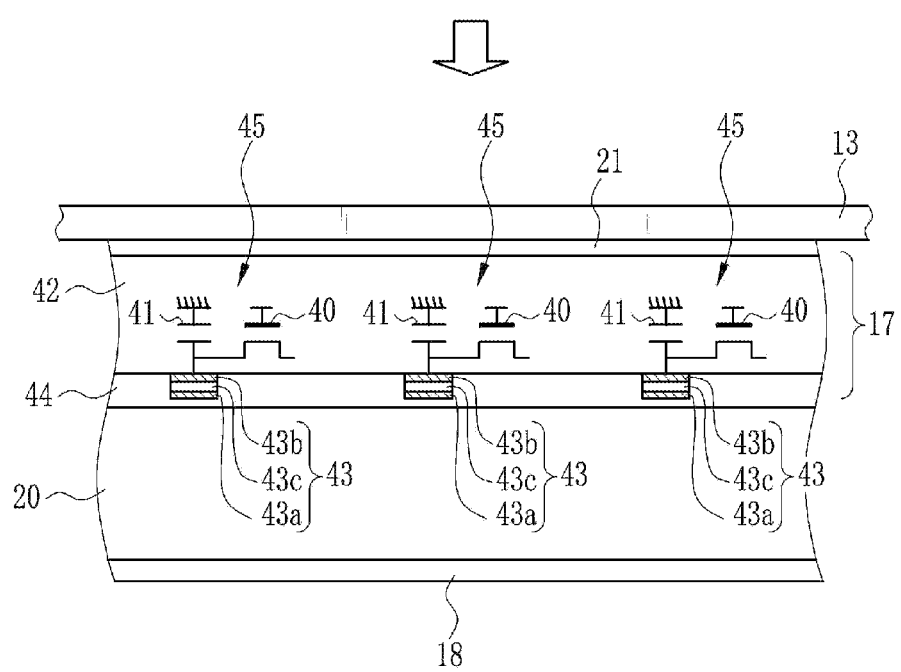
FIG. 4 is a sectional view schematically showing the structure of a photodetector.

As shown in FIG. 4, the photodetector 17 is composed of a plurality of pixel units 45 arranged into a matrix on a TFT substrate 42. Each pixel unit 45 is constituted of a photoelectric converter 43 formed of a photodiode (PD), a thin film transistor (TFT) 40, and a capacitor 41. A surface of the photodetector 17 on a side opposite to the radiation incident direction is formed with a pixel array 44 in which the photoelectric converters 43 are arranged.

The photoelectric converter 43 is constituted of a lower electrode 43a, an upper electrode 43b, and a photoelectric conversion film 43c sandwiched between the lower and upper electrodes 43a and 43b. The photoelectric conversion film 43c absorbs the light emitted from the scintillator 20, and produces electric charge by an amount corresponding to the amount of the absorbed light. The lower electrode 43a is necessarily made of a conductive material that is transparent to at least the wavelength of the light emitted from the scintillator 20, in order to allow the entrance of the light from the scintillator 20 to the photoelectric conversion film 43c. More specifically, the lower electrode 43a is preferably made of transparent conducting oxide that has high transmittance to the visible light and low resistance.

The photoelectric conversion film 43c is made of amorphous silicon. The photoelectric conversion film 43c absorbs the light emitted from the scintillator 20, and produces the electric charge in accordance with the amount of the absorbed light. The amorphous silicon can absorb the light emitted from the scintillator 20 in a wide wavelength band.

Figure 5:
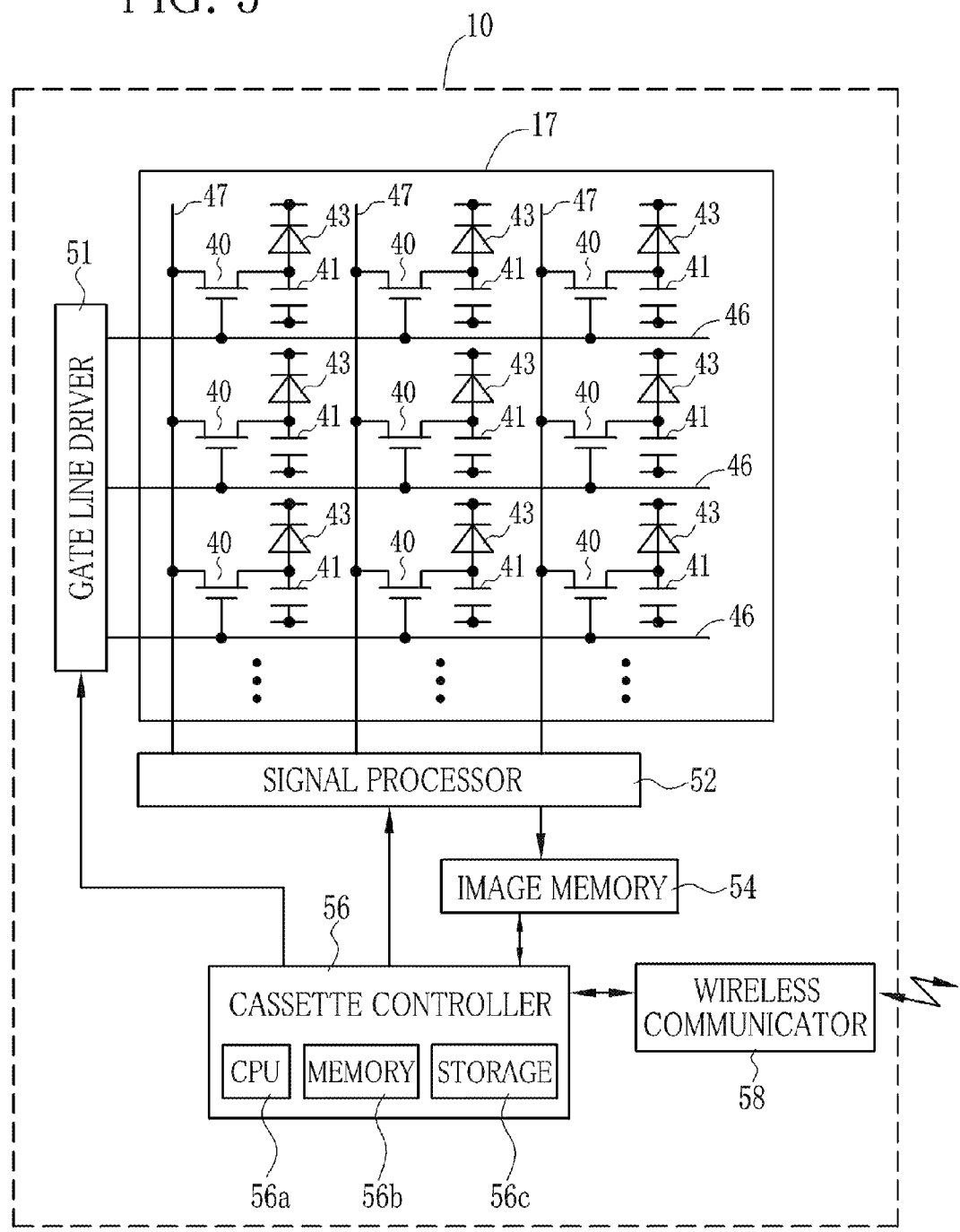
FIG. 5 is a block diagram showing the electrical structure of the electronic cassette.

As shown in FIG. 5, the photodetector 17 has a plurality of gate lines 46 extending in a row direction and a plurality of data lines 47 extending in a column direction, which intersects with the row direction. The TFTs 40 are turned on or off on a row-by-row basis in response to a signal transmitted through the gate lines 46. When the TFT 40 is turned on, the electric charge accumulated in the capacitor 41 (and the middle between the lower electrode 43a and the upper electrode 43b of the photoelectric converter 43) is read out through the data lines 47.

Every gate line 46 is connected to a gate line driver 51, and every data line 47 is connected to a signal processor 52. The radiation passed through the sample is incident upon the electronic cassette 10, and enters the scintillator 20 through the radiation receiving surface 11. The scintillator 20 emits the light from its radiation entrance positions by an amount corresponding to the amount of the radiation incident on each individual radiation entrance position. The photoelectric converter 43 of each pixel unit 45 produces the electric charge the amount of which corresponds to the amount of the light emitted from an opposed portion of the scintillator 20. This electric charge is accumulated in the capacitor 41 (and the middle between the lower electrode 43a and the upper electrode 43b of the photoelectric converter 43) of each individual pixel unit 45.

After the application of the radiation, the electric charge accumulated in each pixel unit 45 of the photodetector 17 is read out. In a readout operation, all the TFTs 40 are successively turned on by the signal transmitted from the gate line driver 51 through the gate lines 46 on a row-by-row basis. The electric charge accumulated in each capacitor 41 connected to the TFT 40 being turned on is transferred through the data line 47 to the signal processor 52, as an analog pixel signal. Thus, the electric charge accumulated in the capacitors 41 is successively read out on a row-by-row basis.

As is widely known, the signal processor 52 is provided with one amplifier and one sample holding circuit (not shown) for each data line 47. The pixel signal transferred through each data line 47 is amplified by the amplifier, and held by the sample holding circuit. All the sample holding circuits are connected to a multiplexer at their output sides, and an output of the multiplexer is connected to an A/D converter. The pixel signals held by the sample holding circuits are successively inputted to the multiplexer, and converted by the A/D converter into digital pixel data.

The signal processor 52 is connected to an image memory 54. The pixel data outputted from the A/D converter of the signal processor 52 is successively written to the image memory 54, as image data of one frame. The image memory 54 has a storage capacity of a plurality of frames of image data. Whenever the radiation image is captured, the captured image data is written to the image memory 54.

The image memory 54 is connected to a cassette controller 56 for controlling the operation of the entire electronic cassette 10. The cassette controller 56 includes a microcomputer, and is provided with a CPU 56a, a memory 56b having a ROM and a RAM, and nonvolatile storage 56c such as a HDD (hard disk drive) and a flash memory.

The cassette controller 56 is connected to a wireless communicator 58. The wireless communicator 58 is compatible with a wireless LAN standard typified by IEEE 802.11a/b/g/n or the like. The wireless communicator 58 controls transmission of various types of information to/from external equipment through a wireless network. The cassette controller 56 performs wireless communication with the image acquisition controller (not shown) through the wireless communicator 58, and sends and receives various types of information, including the patient's ID, the imaging conditions, and the like inputted from a console.

Next, the operation of this embodiment will be described. In taking the radiation image, a doctor or a radiologic technologist loads the electric cassette 10 in the cassette chamber of the imaging support (not shown). At this time, the electric cassette 10 is inserted into the cassette chamber in a state of being directed to the patient. After that, the radiation generating device (not shown) is disposed in front of the patient so as to face the body part to be imaged.

When preparation for radiography is completed, the imaging conditions are inputted from an operation panel of the console. After that, when an exposure key of the image acquisition controller is turned on, a command signal for commanding a start of exposure is transmitted to the radiation generating device. The radiation generating device starts emitting the radiation from a radiation source (not shown). The radiation emitted from the radiation source is passed through the patient's body part to be imaged, and incident upon the radiation receiving surface 11 of the electronic cassette 10. Then, the radiation enters the scintillator 20 through the top plate 13 and the photodetector 17. The columnar crystals 31 of the scintillator 20 convert the incident radiation into the light.

The light produced in each columnar crystal 31 is emitted from the tip end portion 31a to the photoelectric converter 43 of the pixel array 44. Since the tip end portion 31a is in the shape of a cone having an acute vertex, the total reflection of the light hardly occurs. Thus, the light is efficiently emitted from the tip end portion 31a. Each photoelectric converter 43 converts the incident light into the electric charge, and accumulates the electric charge. The electric charge is readout from all the pixel units 45 as the pixel signals, and written to the image memory 54 as the image data of one frame. After the completion of taking the radiation image, the image data is transmitted using the wireless network through the image acquisition controller to the console.

In this embodiment, the substrate 18 is made of copper (Cu). The radiation that has entered the scintillator 20 partly reaches the substrate 18 through the scintillator 20. At this time, Cu having an atomic number of 29 scatters (backscatters) little amount of radiation in a return direction, so the sharpness of the detected radiation image is improved. In other words, the radiation that has propagated through the columnar crystal 31 is reflected backward from the substrate 18, and propagates through the different columnar crystal 31. This causes degradation in the image sharpness.

Figure 6:
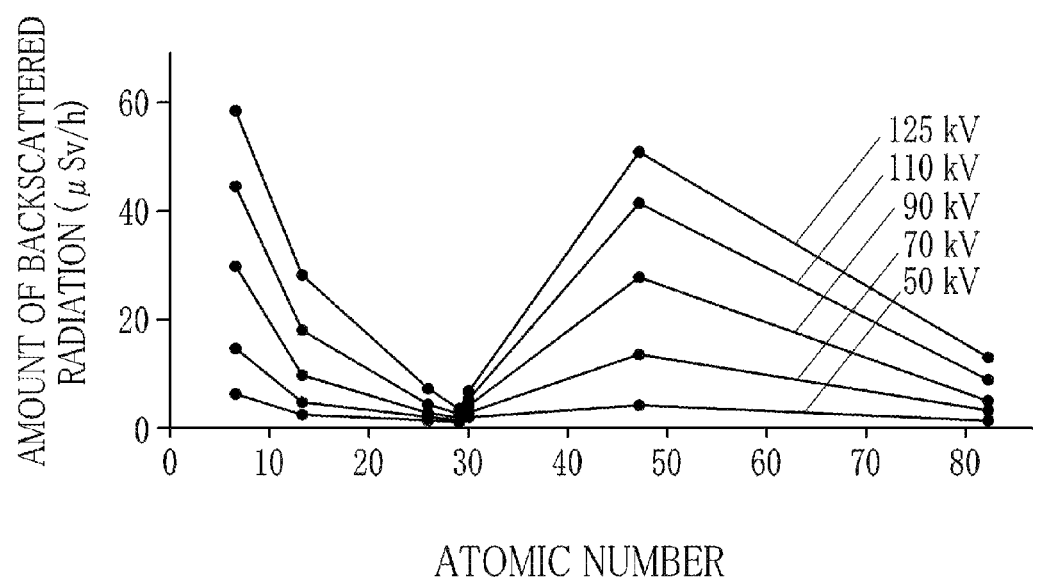
FIG. 6 is a graph showing the dependence of the amount of backscattered radiation on an atomic number.

FIG. 6 is a graph showing the dependence of the amount of backscattered radiation on an atomic number. This experiment data indicates that Cu having an atomic number of 29 has the least amount of backscattered radiation, and is the most suitable as an anti-backscattering material.

Conventionally, a material that contains an element having a large atomic number as a main ingredient, such as lead (Pb) having an atomic number of 82 or tungsten (W) having an atomic number of 74 was used as the anti-backscattering material. However, Pb and W have a K-edge at 88 keV and 69.5 keV, respectively, which exist within an energy band (40 to 140 keVp) of the X-ray source used in the radiography. Therefore, Pb and W absorb a large amount of X-ray, but at the same time, produce a characteristic X-ray at their K-edges. This characteristic X-ray propagates backward to the photodetector 17, and becomes the backscattered radiation. On the contrary, Cu, which is used as the material of the substrate 18 of this embodiment, has a K-edge at 8.98 keV beyond the confines of the above energy band (40 to 140 keVp), and hence produces no characteristic X-ray. Thus, the substrate 18 of Cu produces little amount of backscattered radiation.

Also, Cu is preferably used as the material of the substrate 18, in view of adhesion to CsI being a material of the scintillator 20. This is because, as described in U.S. Pat. No. 6,600,158 corresponding to Japanese Patent Laid-Open Publication No. 2001-74846, CsI is hard to adhere to a low thermal conductive material, and easily separated from such material by exfoliation. The thermal conductivity of Cu is much higher than those of aluminum (Al), iron (Fe), and nickel (Ni), so Cu has a high adhesion property to CsI.

Note that, the substrate 18 may be made of a material containing an element other than Cu as a main ingredient, as long as the material has a K-edge beyond the confines of the above energy band (40 to 140 keVp) and absorbs a certain amount of X-ray. To be more specific, the substrate 18 is made of a material containing any one or two or more elements having atomic numbers of 20 to 31 as main ingredients. The substrate 18 is preferably made of a material containing any one or two or more elements having atomic numbers of 22 to 30 as main ingredients.

In this embodiment, the substrate 18 is in the shape of a box without a top, and the top of the substrate 18 is closed with the photodetector 17. The substrate 18 and the photodetector 17 seal the scintillator 20 in an air-tight manner. This eliminates the need for providing a moisture-proof material of the scintillator 20, such as parylene. This structure is also useful for protecting the scintillator 20 against a load applied from the top plate 13. Furthermore, the substrate 18 having the four sidewalls 18b facilitates handling of the scintillator 20. Note that, a drying agent may be infused into space enclosed with the substrate 18 and the photodetector 17, for the purpose of further increasing resistance to moisture of the scintillator 20.

In the above embodiment, the substrate 18 and the photodetector 17 are joined through the O-ring 26. The O-ring 26 has resistance to shock, and hence is useful for preventing the deformation of the tip end portions 31a of the columnar crystals 31 by the shock.

Figure 7:
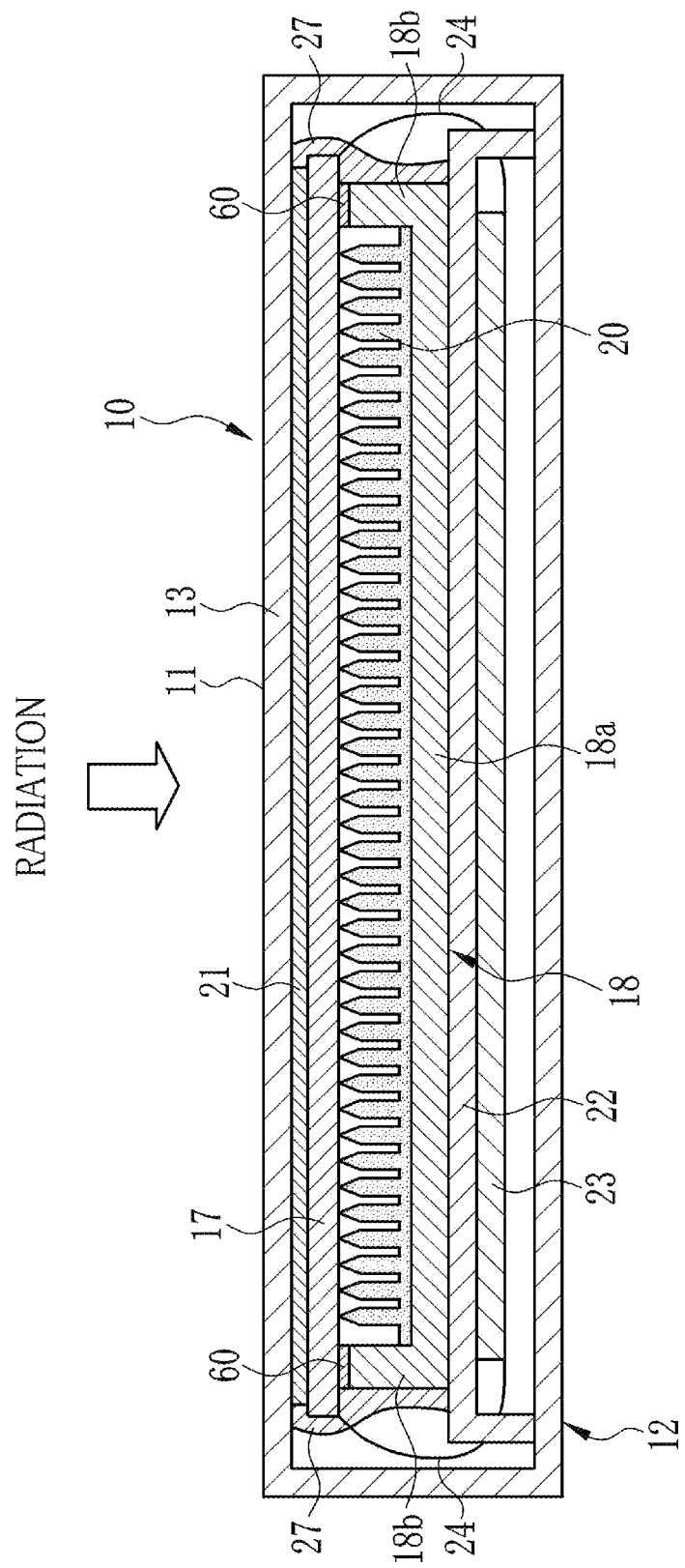
FIG. 7 is a schematic sectional view of an electronic cassette according to another embodiment of the present invention.

In the above embodiment, the O-ring 26 is disposed between the substrate 18 and the photodetector 17, and the fixing agent 27 secures the substrate 18 and the photodetector 17. Instead of using the O-ring 26, as shown in FIG. 7, the substrate 18 and the photodetector 17 are preferably joined together with a peelable dissolvable adhesive 60. In this embodiment, the sidewalls 18b of the substrate 18 have no grooves. Instead, the dissolvable adhesive 60 is applied to the top surfaces of the sidewalls 18b to bond the top surfaces of the sidewalls 18b to the margin of the photodetector 17. At this time, the fixing agent 27 may be omitted.

As the dissolvable adhesive 60, for example, an adhesive released (reducing its adhesion) by irradiation with ultraviolet light is preferably used. In this case, when the photodetector 17 or the scintillator 20 is in need of replacement due to damage, the dissolvable adhesive 60 is irradiated with the ultraviolet light through the photodetector 17. The substrate 18 is easily removed from the photodetector 17 by the irradiation with the ultraviolet light, so the photodetector 17 or the scintillator 20 can be replaced.

In the above embodiment, the scintillator 20 is directly evaporated onto the substrate 18. However, as shown in FIG. 8, a light reflection layer 70 may be formed on the bottom 18a of the substrate 18 by aluminum (Al) plating, and the scintillator 20 may be evaporated onto the light reflection layer 70. The light that has been produced in the scintillator 20 and propagated in a direction opposite to the photodetector 17 is reflected from the light reflection layer 70 to the photodetector 17. Thus, the light reflection layer 70 further improves the light emission efficiency from the tip end portions 31a of the columnar crystals 31. The light reflection layer 70 may be made of any metal other than Al, as long as the metal has reflectivity for a peak wavelength of the emission light from the scintillator 20.

In the above embodiment, the photoelectric conversion film 43c of the photoelectric converter 43 is made of amorphous silicon, but may be made of a material including an organic photoelectric conversion material. In this case, an absorption spectrum shows its peak mainly in a visible light range, and the photoelectric conversion film 43c hardly absorbs an electromagnetic wave other than the light emitted from the scintillator 20. Thus, it is possible to prevent the occurrence of noise caused by absorption of the radiation such as the X-ray or γ-ray by the photoelectric conversion film 43c.

The photoelectric conversion film 43c made of the organic photoelectric conversion material can be formed by adhesion of the organic photoelectric conversion material on the TFT substrate 42 using a liquid discharge head such as an inkjet head, so no heat resistance is required of the TFT substrate 42. Thus, the TFT substrate 42 may be made of a material other than glass.

When the photoelectric conversion film 43c is made of the organic photoelectric conversion material, the photoelectric conversion film 43c hardly absorbs the radiation. Thus, in the ISS method, it is possible to prevent attenuation of the radiation caused by transmission of the radiation through the photodetector 17. For this reason, making the photoelectric conversion film 43c of the organic photoelectric conversion material is suitable in particular for the ISS method.

It is preferable that an absorption peak wavelength of the organic photoelectric conversion material for making the photoelectric conversion film 43c is as near as possible to an emission peak wavelength of the scintillator 20, for the purpose of most efficiently absorbing the light from the scintillator 20. The absorption peak wavelength of the organic photoelectric conversion material ideally coincides with the emission peak wavelength of the scintillator 20, but if not, the less the difference therebetween, the more sufficiently the light from the scintillator 20 can be absorbed. To be more specific, the difference between the absorption peak wavelength of the organic photoelectric conversion material and the emission peak wavelength of the scintillator 20 is preferably 10 nm or less, and more preferably 5 nm or less.

As the organic photoelectric conversion material satisfying such a condition, there are quinacridone organic compounds and phthalocyanine organic compounds. The absorption peak wavelength of quinacridone in the visible light range is 560 nm. Thus, the use of the quinacridone as the organic photoelectric conversion material and the use of CsI:Tl as the material of the scintillator 20 make it possible to confine the difference between the peak wavelengths within 5 nm. Therefore, the photoelectric conversion film 43c can produce the electric charge by a maximum amount.

The photoelectric conversion film 43c applicable to the radiation image detecting device will be concretely described. In the radiation image detecting device, an electromagnetic wave absorption and photoelectric conversion portion is constituted of an organic layer including the electrodes 43a and 43b and the photoelectric conversion film 43c sandwiched between the electrodes 43a and 43b. To be more specific, this organic layer is formed by stacking or mixing an electromagnetic wave absorbing portion, a photoelectric conversion portion, an electron transport portion, a hole transport portion, an electron blocking portion, a hole blocking portion, a crystallization preventing portion, electrodes, an interlayer contact improving portion, and the like.

The above organic layer preferably contains an organic p-type compound or an organic n-type compound. The organic p-type compound is a donor organic semiconductor mainly typified by a hole transport organic compound, and has the property of donating electrons. In more detail, when two types of organic materials are used in contact with each other, the organic p-type compound denotes an organic compound having less ionization potential. Any organic compound is available as the donor organic semiconductor as long as the organic compound can donate the electrons. The organic n-type compound is an acceptor organic semiconductor mainly typified by an electron transport organic compound, and has the property of accepting the electrons. In more detail, when two types of organic materials are used in contact with each other, the organic n-type compound denotes an organic compound having more electron affinity. Any organic compound is usable as the acceptor organic semiconductor as long as the organic compound has electron receptivity.

Materials usable as the organic p-type compound and the organic n-type compound and the structure of the photoelectric conversion film 43c are described in U.S. Pat. No. 7,847, 258 corresponding to Japanese Patent Laid-Open Publication No. 2009-32854 in detail, so description thereof will be omitted.

The photoelectric converter 43 may have any structure as long as it includes at least a pair of electrodes 43a and 43b and the photoelectric conversion film 43c. In addition, the photoelectric converter 43 preferably has one of an electron blocking layer and a hole blocking layer, and more preferably has both, in order to prevent increase of dark current.

The electron blocking layer can be provided between the upper electrode 43b and the photoelectric conversion film 43c. When a bias voltage is applied between the upper electrode 43b and the lower electrode 43a, the electron blocking layer prevents increase of the dark current by infusion of the electrons from the upper electrode 43b into the photoelectric conversion film 43c. An electron donating organic material is used as the electron blocking layer. The concrete material of the electron blocking layer is chosen in accordance with the materials of the adjoining electrode and the adjoining photoelectric conversion film 43c, and preferably has an electron affinity (Ea) by 1.3 eV or more larger than the work function (Wf) of the material of the adjoining electrode, and preferably has an ionization potential (Ip) equal to or less than the Ip of the material of the adjoining photoelectric conversion film 43c. Materials usable as the electron donating organic material are described in the U.S. Pat. No. 7,847,258 in detail, and the description thereof is omitted.

The thickness of the electron blocking layer is preferably 10 nm or more and 200 nm or less, and more preferably 30 nm or more and 150 nm or less, and most preferably 50 nm or more and 100 nm or less, in order to certainly bring out a dark current restriction effect and prevent reduction of a photoelectric conversion efficiency of the photoelectric converter 43.

The hole blocking layer is provided between the photoelectric conversion film 43c and the lower electrode 43a. When the bias voltage is applied between the upper electrode 43b and the lower electrode 43a, the hole blocking layer prevents increase of the dark current by infusion of holes from the lower electrode 43a into the photoelectric conversion film 43c. An electron accepting organic material is used as the hole blocking layer. The concrete material of the hole blocking layer is chosen in accordance with the materials of the adjoining electrode and the adjoining photoelectric conversion film 43c, and preferably has an ionization potential (Ip) by 1.3 eV or more larger than the work function (Wf) of the material of the adjoining electrode, and preferably has an electron affinity (Ea) equal to or larger than the Ea of the material of the adjoining photoelectric conversion film 43c. Materials usable as the electron accepting organic material are described in the U.S. Pat. No. 7,847,258 in detail, and the description thereof is omitted.

The thickness of the hole blocking layer is preferably 10 nm or more and 200 nm or less, and more preferably 30 nm or more and 150 nm or less, and most preferably 50 nm or more and 100 nm or less, in order to certainly bring out the dark current restriction effect and prevent reduction of the photoelectric conversion efficiency of the photoelectric converter 43.

Note that, the positions of the electronic blocking layer and the hole blocking layer are reversed, when the bias voltage is applied such that the holes of the electric charge produced in the photoelectric conversion film 43c move to the lower electrode 43a, and the electrons move to the upper electrode 43b. Both the electron blocking layer and the hole blocking layer are not necessarily provided. Providing one of the electron blocking layer and the hole blocking layer allows obtainment of a certain degree of the dark current restriction effect.

As an amorphous oxide for forming an active layer of the TFT 40, oxides (for example, In—O oxide) containing at least one of In, Ga, and Zn are preferable, and oxides (for example, In—Zn—O oxide, In—Ga—O oxide, and Ga—Zn—O oxide) containing at least two of In, Ga, and Zn are more preferable, and oxides containing all of In, Ga, and Zn are the most preferable. As an In—Ga—Zn—O amorphous oxide, an amorphous oxide of a composition represented by $InGaO_3(ZnO)_m$ (m represents natural number less than 6) in a crystalline state is preferable, and especially, $InGaZnO_4$ is more preferable. Note that, the amorphous oxide for forming the active layer is not limited to above.

An organic semiconducting material for forming the active layer includes a phthalocyanine compound, pentacene, vanadyl phthalocyanine, and the like, but is not limited to them. The composition of the phthalocyanine compound is described in U.S. Pat. No. 7,768,002 corresponding to Japanese Patent Laid-Open Publication No. 2009-212389 in detail, so the description thereof is omitted.

Forming the active layer of the TFT 40 out of one of the amorphous oxide, the organic semiconducting material, a carbon nanotube, and the like can effectively restrict the occurrence of noise, because these materials do not or hardly absorb the radiation such as the X-ray.

When the active layer is formed of the carbon nanotube, it is possible to accelerate the switching speed of the TFT 40, and reduce the degree of absorption of light in the visible light range by the TFT 40. When the active layer is formed of the carbon nanotube, the performance of the TFT 40 significantly degrades only by mixture of a slight amount of metal impurity into the active layer. Thus, it is necessary to isolate and extract the carbon nanotube of extremely high purity by centrifugation or the like, for use in the formation of the active layer.

The TFT substrate 42 can be made of any material as long as it is light transparent and has low radiation absorptivity. Both the amorphous oxide for making the active layer of the TFT 40 and the organic photoelectric conversion material for making the photoelectric conversion film 43c of the photoelectric converter 43 can be deposited at low temperature. Thus, the TFT substrate 42 can be made of not only a heat-resistant material such as semiconductor, quartz, and glass, but also flexible plastic, aramid, and bio-nanofiber. To be more specific, a flexible substrate made of polyester including polyethylene terephthalate, polybutylene phthalate, and polyethylene naphthalate, polystyrene, polycarbonate, polyether sulfone, polyalirate, polyimid, polycycloolefin, norbornene resin, poly(chlorotrifluoroethylene), or the like is available. Using the flexible substrate made of the plastic contributes to weight reduction and ease of portability. Note that, the TFT substrate 42 may be provided with an insulating layer for securing insulation, a gas barrier layer for preventing transmission of moisture and oxygen, an undercoat layer for improving flatness and adhesion to the electrode, and the like.

Since the aramid can be subjected to a high temperature process of 200° C. or more, a transparent electrode material can be cured at high temperature with reduction of resistance therein, and automatic mounting of a driver IC including a reflow soldering process can be performed thereon. The aramid has a thermal expansion coefficient close to those of ITO (indium tin oxide) and the glass substrate, and hence is hard to warp and crack after manufacture. The aramid substrate can be thinner than the glass substrate. Note that, to form the TFT substrate 42, an ultra-slim glass substrate may be laminated with the aramid.

The bio-nanofiber is a complex of a cellulose microfibril bundle (bacterial cellulose) produced by bacteria (acetobacter xylinum) and transparent resin. The cellulose microfibril bundle has a width of 50 nm, being one-tenth of the wavelength of the visible light, and high strength, high elasticity, and low thermal expansion. Impregnating the transparent resin such as acrylic resin or epoxy resin to the bacterial cellulose and hardening it make it possible to obtain the bio-nanofiber that contains fiber at 60 to 70% and has light transmittance of approximately 90% at a wavelength of 500 nm. The bio-nanofiber has a low thermal expansion coefficient (3 to 7 ppm) comparable to a silicon crystal, high strength (460 MPa) comparable to steel, high elasticity (30 GPa), and flexibility. Therefore, the bio-nanofiber substrate can be thinner than the glass substrate.

If the glass substrate is used as the TFT substrate 42, the thickness of the entire photodetector 17 is of the order of 0.7 mm. However, through the use of a thin substrate made of the light transparent plastic as the TFT substrate 42, the thickness of the entire photodetector 17 can be thinned to the order of 0.1 mm, and the photodetector 17 is made flexible. The flexibility of the photodetector 17 improves impact resistance of the electronic cassette 10, so the electronic cassette 10 becomes hard to break. Also, formation of the TFT substrate 42 out of the material with the low radiation absorptivity, such as the plastic resin, the aramid, or the bio-nanofiber, can prevent reduction in the sensitivity in the ISS method.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device comprising:
   a substrate formed of a material containing any one or two or more elements having an atomic number of 20 to 31 as a main ingredient;
   a scintillator having a plurality of columnar crystals formed on said substrate by evaporation, for converting incident X-ray into light and emitting said light from a tip end portion of each of said columnar crystals; and
   a board-shaped photodetector opposed to said tip end portions of said columnar crystals, for detecting said light emitted from said tip end portions,
   wherein said photodetector includes a glass substrate,
   wherein said photodetector, said scintillator and said substrate are disposed from an upstream side in an X-ray incident direction, and
   wherein said X-ray enters said scintillator through said photodetector.

2. The radiation image detecting device according to claim 1, wherein
   said substrate is in a shape of a box having a bottom, sidewalls, and an opened top;
   said scintillator is formed on said bottom; and
   said plurality of columnar crystals are erected to said top.

3. The radiation image detecting device according to claim 2, wherein said photodetector is overlaid on said sidewalls so as to tightly seal an interior of said substrate.

4. The radiation image detecting device according to claim 3, wherein said scintillator and said photodetector are contained in a housing of an electronic cassette.

5. The radiation image detecting device according to claim 3, wherein said substrate is made of a material containing any one or two or more elements having an atomic number of 22 to 30 as a main ingredient.

6. The radiation image detecting device according to claim 5, wherein said substrate is made of a material containing copper as a main ingredient.

7. The radiation image detecting device according to claim 3, wherein said photodetector is joined to said sidewalls of said substrate through a medium of a sealing member.

8. The radiation image detecting device according to claim 7, wherein said sealing member is an O-ring.

9. The radiation image detecting device according to claim 8, wherein a flexible fixing agent is applied to said sidewalls and side surfaces of said photodetector, to join said sidewalls and said photodetector.

10. The radiation image detecting device according to claim 3, wherein said sidewalls and said photodetector are joined together with a dissolvable adhesive.

11. The radiation image detecting device according to claim 10, wherein adhesion of said dissolvable adhesive is reduced by irradiation with ultraviolet light.

12. The radiation image detecting device according to claim 3, wherein a light reflection layer for reflecting light having an emission peak wavelength of said scintillator is provided on said substrate, and said scintillator is formed on said light reflection layer.

13. The radiation image detecting device according to claim 12, wherein said light reflection layer is made of aluminum.

14. The radiation image detecting device according to claim 3, wherein said tip end portions of said columnar crystals are in contact with said photodetector.

15. The radiation image detecting device according to claim 3, wherein said tip end portion of said columnar crystal is in a shape of a cone.

16. The radiation image detecting device according to claim 3, wherein said plurality of columnar crystals are separated to each other by a gap.

17. The radiation image detecting device according to claim 3, wherein
   said scintillator is cesium iodide; and
   said plurality of columnar crystals are formed on said bottom through a medium of a non-columnar crystal.

18. The radiation image detecting device according to claim 3, wherein
   said photodetector has a plurality of photoelectric converters arranged into a matrix; and
   each of said photoelectric converters has a photoelectric conversion film made of silicon or an organic photoelectric conversion material.

* * * * *